United States Patent

Weber

[11] Patent Number: 5,559,634
[45] Date of Patent: Sep. 24, 1996

[54] RETROREFLECTING POLARIZER

[75] Inventor: Michael F. Weber, Shoreview, Minn.

[73] Assignee: Minnesota Mining and Manufacturing Company, St. Paul, Minn.

[21] Appl. No.: 329,623

[22] Filed: Oct. 26, 1994

Related U.S. Application Data

[63] Continuation of Ser. No. 714,688, Jun. 13, 1991, abandoned.

[51] Int. Cl.$^6$ ............. G02B 27/14; G02B 5/124; G02B 5/30
[52] U.S. Cl. .......... 359/638; 359/487; 359/490; 359/530; 359/589; 359/495; 359/498
[58] Field of Search .............. 350/97, 102, 170–173, 350/394–395, 402–403, 335, 337, 396–398, 103, 109, 286; 359/485, 489, 487, 488, 494–496, 529–530, 618, 629, 634, 834, 586–589, 490, 498

[56] References Cited

U.S. PATENT DOCUMENTS

| | | | |
|---|---|---|---|
| 1,610,423 | 12/1926 | Cawley . | |
| 2,403,731 | 7/1946 | McNeille | 350/395 |
| 2,492,809 | 12/1949 | Marks . | |
| 2,748,659 | 6/1956 | Geffcken et al. | 359/487 |
| 2,887,566 | 5/1959 | Marks | 359/494 |
| 3,153,740 | 10/1964 | Murphy | 359/494 |
| 3,731,996 | 5/1973 | Siksai . | |
| 3,912,920 | 10/1975 | Kubota . | |
| 4,733,065 | 3/1988 | Hoshi et al. | 250/206.2 |
| 4,805,984 | 2/1989 | Cobb, Jr. | 350/96.28 |
| 4,841,908 | 6/1989 | Jacobson et al. | 118/718 |
| 4,874,631 | 10/1989 | Jacobson et al. | 427/39 |
| 4,906,070 | 3/1990 | Cobb | 350/286 |
| 4,913,529 | 4/1990 | Goldenberg et al. | 350/337 |
| 4,917,465 | 4/1990 | Conner et al. | 350/335 |
| 4,966,438 | 10/1990 | Mouchart et al. | 350/173 |
| 4,966,441 | 10/0990 | Conner | 350/335 |
| 4,974,219 | 11/1990 | Korth | 369/13 |
| 5,013,107 | 5/1991 | Biles | 350/3.7 |
| 5,042,921 | 8/1991 | Sato et al. . | |
| 5,061,050 | 10/1991 | Ogura | 359/490 |
| 5,096,520 | 3/1992 | Faris . | |
| 5,124,841 | 6/1992 | Oishi . | |
| 5,126,880 | 6/1992 | Wheatley et al. . | |

FOREIGN PATENT DOCUMENTS

| | | |
|---|---|---|
| 578035 | 6/1959 | Canada . |
| 0285397 | 5/1988 | European Pat. Off. .......... H01S 3/08 |
| 0390344 | 3/1990 | European Pat. Off. ........ G02B 5/124 |
| 0422661A2 | 4/1991 | European Pat. Off. ........ G02B 27/28 |
| 0488544A1 | 6/1992 | European Pat. Off. . |
| 2137422 | 8/1973 | Germany ........................ G02B 5/30 |
| 61-017103 | 1/1986 | Japan . |
| 61-262705 | 11/1986 | Japan . |

OTHER PUBLICATIONS

"Headlights for Motor–Vehicles with Polarized Light," Reprint of *Lichttechnik*, vol. 25 No. 3, 1973, pp. 100–103 (Translation of Scheinwerfer für Kraftfahrzeuge mit polarisiertem Licht, Sonderdruck aus Jahrgang 25 (1973), Heft 3, Seiten 100–103) (Zehender).

"Novel Polarized Liquid–Crystal Color Projection and New TN–LCD Operating Modes," Society for Information Display (SID) Digest, 1990, pp. 324–326 (Schadt et al.).

Patent Abstracts of Japan, vol. 10, No. 298 (P-505) 9 Oct. 1986 & JP,A,61 114 205 (Nippon Ceramic KK), abstract.

*Primary Examiner*—James Phan
*Attorney, Agent, or Firm*—Gary L. Griswold; Walter N. Kirn; Eric D. Levinson

[57] ABSTRACT

A retroreflecting polarizer, comprising optical thin films coated on a structured material, divides an incident beam of light into polarized components, transmitting one component through the polarizer and reflecting the other back to the source.

11 Claims, 2 Drawing Sheets

RETROREFLECTING POLARIZER

This is a continuation of application Ser. No. 07/714,688 filed Jun. 13, 1991, now abandoned.

TECHNICAL FIELD

This invention relates to polarizing thin film stacks coated onto substrates having structured surfaces.

BACKGROUND

A MacNeille polarizer comprises alternating repeating layers of a pair of thin film materials deposited on a bulk substrate material. The pair of thin film materials comprises one low refractive index material and one high refractive index material. The indices, called a MacNeille pair, are chosen such that, for a given angle of incidence of a light beam, the reflection coefficient for p-polarized light ($r_p$) is essentially zero at each thin film interface. The angle at which $r_p$ is zero is called the Brewster angle, and the formula relating the Brewster angle to the numerical values of the indices is called the MacNeille condition. The reflection coefficient for s-polarized light ($r_s$) is non-zero at each thin film interface. Therefore, as more thin film layers are added, the total reflectivity for s-polarized light increases while the reflectivity for p-polarized light remains essentially zero. Thus, an unpolarized beam of light, incident upon the thin film stack, has some or all of the s-polarized components reflected while essentially all of the p-polarized component is transmitted.

Such a thin film stack is deposited on two general types of substrates, which then classifies the type of polarizer produced as either immersed or non-immersed. For example, if the thin films are deposited on a flat face which forms the hypotenuse side of a right angle (Porro) prism, and bonded to the similar side of an identical prism, the polarizer is an immersed polarizer. If the thin films are bonded between two planar slabs of transparent media, the polarizer is a non-immersed polarizer. In general, a polarizer is non-immersed if the geometry of the bulk encapsulant does not affect the immersion constant $n_i^* \sin(V^{\theta_i})$ of the light beam in a thin film material $m_i$.

For either immersed or non-immersed polarizers, the p-polarization component of an incident light beam is transmitted, while the s-polarization component is reflected from the thin film stack at an angle equal to the angle of incidence. The total change in direction of the s-polarization component from the incident direction is 90° for cube polarizers and usually about 120° for slab polarizers. Thus, the s-polarization component is typically unavailable for further use, leading to a decrease in overall intensity of light available, unless additional optics are employed to redirect the s-polarization component. For example, U.S. Pat. No. 4,913,529 (Goldenberg et al.) discloses a liquid crystal display (LCD) television projection system using two reflectors, a polarization rotator and a prism to recombine both components.

Such systems are undesirably large for use in many common visual display systems, such as overhead projectors, and especially in portable or laptop computer displays where a thin profile is desired.

DISCLOSURE OF INVENTION

The invention is a retroreflecting polarizer, comprising:

(a) a first material having a structured surface consisting of a linear array of substantially right angled isosceles prisms arranged side by side and having perpendicular sides which make an angle of approximately 45° with respect to the tangent to a smooth surface opposite the structured surface, (b) a second material essentially like the first material, (c) on the structured surface of at least one material, at least one optical stack of alternating layers of high and low refractive index materials of selected optical thicknesses; the first and second materials all optically cemented to form a single unit in which the refractive index of the first and second materials, and the refractive indices and optical thicknesses of the layers of the optical stack, are all chosen to produce selective reflection of polarized light, such that:

(d) within one portion of the optical stack, an incident light beam of mixed polarization is separated into an s-polarized component and a p-polarized component, (e) the s-polarized component is reflected onto another portion of the optical stack and there reflected parallel to the incident beam but proceeding in an opposite direction, and (f) the p-polarized component is transmitted parallel to the incident beam.

DETAILED DESCRIPTION OF THE INVENTION

Figure 1:
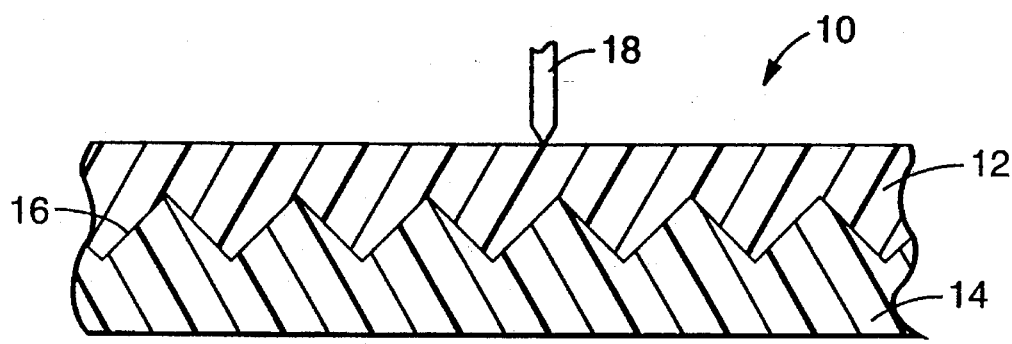
FIG. 1 is a cross sectional view of a portion of one preferred embodiment of the invention.
Figure 2:
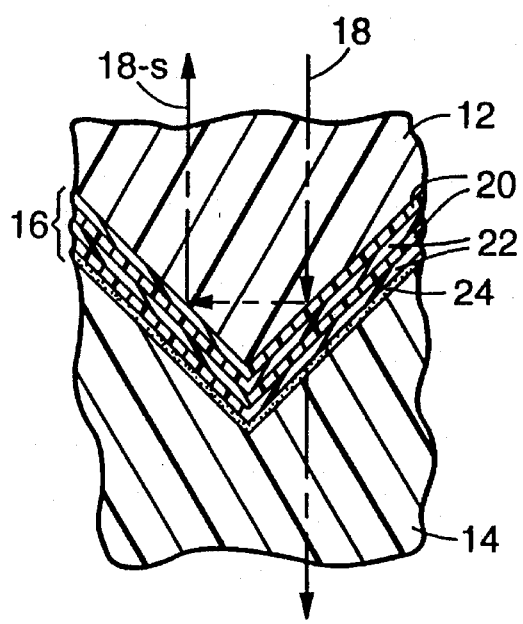
FIG. 2 is an enlarged sectional view of a portion of the embodiment of FIG. 1.

FIGS. 1 and 2 show an inventive retroreflecting polarizer 10, comprising two pieces of transparent substrate material 12 and 14, between which is is a composite optical stack 16.

The pieces 12,14 each have structured surfaces (which face each other), and non-structured surfaces. As shown, piece 12 is a top layer and piece 14 is a substrate, but the entire assembly may be inverted with no loss of functionality, essentially interchanging the roles of the two pieces.

In the embodiment shown, the composite optical stack 16 is deposited upon the structured surface of the upper piece 12, and the structured surface of the lower piece 14 is optically cemented (i.e., adhered by a very thin layer of transparent adhesive) to the composite optical stack 16 by an adhesive 24 to form a single unit. However, the composite optical stack could comprise two sub-stacks, one sub-stack deposited on the top layer and the other deposited on the substrate, with adhesive 24 between the two sub-stacks.

The composite optical stack comprises at least one set of pairs of alternating layers of materials having low and high indices of refraction compared to each other. The thicknesses of the layers are chosen such that the quarterwave criterion is met for the wavelength of the incident collimated light beam 18 by each of layers 20 and 22. The shape of the structured surfaces, the optical properties of the substrate material, and the properties of the composite optical stack, all combine to divide the incident light beam into two polarization components. One component, 18-s, is reflected twice in such a manner as to be retroreflected, i.e., directed back toward the source of light beam 18. The other component, 18-p, is transmitted parallel to incident beam 18.

(In FIG. 2, the division of incident light 18 into components 18-s and 18-p is shown as occurring at the first interface between the substrate and the composite optical stack, but this is illustrative only. Actually, some division occurs at each interface between thin films, with the net result being as shown.)

In the embodiment shown, the composite optical stack comprises a repeating stack of a pair of materials. One of the materials is a relatively low refractive index ($n_L$) material 20, and the other is a relatively high index ($n_H$) material 22. The construction of such a stack 16 is abbreviated (HL)². In general, more layers are used, such as a (HL)⁵ stack, and generally the average optical thickness of each material is a quarterwave thick, with reference to a chosen wavelength of interest (typically but not necessarily in the visible spectrum). However, to optimize performance, the individual thicknesses of all thin film layers are varied slightly from the average thickness, in accordance with known principles, using commercially available software to calculate the desired values.

Also, more than two pairs of materials or average thicknesses may be used, such as a $(H_1L_1)^5+(H_2L_2)^5$. This would be done to extend the useful optical bandwidth of the invention or the range of angles over which the invention reflects essentially all s-polarized light.

Each of substrate pieces 12 and 14 comprises a transparent, preferably integral (i.e., a single continuous piece as opposed to an assembly or a laminate) material having a structured surface which consists of a linear array of substantially right angled isosceles prisms arranged side by side. The perpendicular sides of each prism make an angle of approximately 45° with respect to the smooth surface opposite the structured surface (or, in the most general case of a flexible substrate, with respect to the tangent to the structured surface). Angles other than 45° are useful for other applications, but angles near 45° (e.g., 40° to 50°) are preferred in this invention. This places a constraint on the design of the optical stack: only two of the three indices of refraction ($n_L$ and $n_H$ for the optical stack, $n_O$ for the substrate pieces) can be chosen independently. (An additional implication is that $n_L$ must always be less than $n_O$.) These values are determined by the MacNeille condition relating the Brewster angles of each material interface to the numerical values of the indices of the materials forming the interface:

$$\tan(\theta_L)=(n_H/n_L)$$

or, $$\tan(\theta_H)=(n_L/n_H)$$

along with Snell's law relating $\theta_O$ to $\theta_L$ and $\theta_H$.

In theory, an infinite set of values of $n_H$ and $n_L$ exist for a given $n_O$, but in practice, the available choices of materials for the substrate pieces and thin films are limited, and design of the invention reduces to choosing which of the limited set of values of $n_H$ and $n_L$ around that value of $n_O$ will produce the desired results. The greater the difference between $n_L$ and $n_H$, the wider the optical bandwidth over which the invention will divide incident light into separate polarizations.

A suitable thickness of the substrate is 0.33 millimeters, measured from the smooth surface to the lowest point of the grooves. Suitable groove heights (measured perpendicularly) are 0.18 mm. For such a film, about 28 peaks per centimeter is preferred, but there is wide latitude in the dimensions.

Preferred substrate materials are flexible, homogeneous, and isotropic. Suitable materials include commercially available acrylics and polycarbonates having nominal indices of refraction of 1.49 and 1.59, respectively. Other possible materials, selected to provide the required functionality, include polypropylenes, polyurethanes, polystyrenes, and polyvinylchlorides. Generally, polycarbonates are preferred for their relatively high indices of refraction, clarity, and physical properties.

A suitable material is taught in U.S. Pat. No. 4,805,984 (Cobb, Jr.), but in this invention the total internal reflection property of that material is not relevant, because the optical properties of the material are significantly changed when it is employed in this invention.

Suitable materials for the thin films 20 and 22 include any materials which are transparent (exhibit low absorption) in the spectrum of interest. For broadband visible light, suitable thin film materials are silicon dioxide ($SiO_2$) (n=1.45); amorphous hydrogenated silicon nitride (a-SiN:H) (n=1.68–2.0); titanium dioxide ($TiO_2$) (n=2.2–2.5); magnesium fluoride ($MgF_2$) (n=1.38); cryolite ($Na_3AlF_6$) (n=1.35); zirconium oxide ($ZrO_2$) (n=2.05); hafnium oxide (n=2.0); and aluminum nitride (n=2.2). Silicon nitride ($Si_3N_4$) is suitable, but has not been formed successfully on the preferred polycarbonate substrate.

Several thin film deposition techniques can be used to deposit the composite optical stack on the substrate. Thermal and electron beam evaporation, and ion beam sputtering are the methods of choice for precision optical coatings, the latter method producing superior films in terms of adhesion to the substrate, hardness, and environmental stability. Magnetron sputtering is also used extensively for broadband coatings such as anti-reflective coatings on glass, and especially for large area applications such as architectural glass. However, on the whole, thermal and electron beam evaporation should provide good thin film qualities and sufficiently high deposition rates for acceptable manufacturing rates. More importantly, low index films such as magnesium fluoride and cryolite can be deposited by this method. Electron beam deposition is regularly used in the coatings industry for high index materials such as titanium dioxide, zirconium oxide, hafnium oxide, and aluminum nitride.

The process used in the reduction to practice of the invention was plasma assisted chemical vapor deposition (PACVD). Using this PACVD, the following procedures and resultant products are possible.

$SiO_2$ may be deposited by reacting silane ($SiH_4$) or almost any organosilane in the PAVCD process with oxygen or nitrous oxide at between 50 and 250 milliTorr, using low power RF plasmas of about 50–100 watt/ft² of electrode area. Nitrous oxide is somewhat preferred because it generally results in less powder formations in the gas phase.

$TiO_2$ may be formed by reacting titanium tetrachloride ($TiCl_4$) with oxygen and nitrous oxide at the same power levels. By varying both the relative and absolute flow rates of the $O_2$ and $N_2O$ for a given flow of $TiCl_4$ vapor, the index of refraction of the film is easily varied, from 2.0 to 2.4. Residual chlorine in the film can result in poor adhesion to polycarbonate. An oxygen flow of several times in excess of the reactant gas is preferred.

The visibly transparent a-SiN:H material has an index of refraction which varies mainly as a function of deposition temperature, with the higher indices requiring temperatures of 250 Celsius or more. The films may be deposited from mixtures of silane, ammonia, and nitrogen. Films formed at lower temperatures from conditions suitable for high index films (i.e., silane, starved nitrogen, no ammonia) produce undesirably high absorption of blue light. It is possible to form films having indices between 1.68 and 1.8 on polycarbonate below 100 C., with low optical absorption, although the lower index films are somewhat brittle.

The PACVD process was carried out using a deposition system according to the teachings of U.S. Pat. Nos. 4,841,908 and 4,874,631 (Both Jacobson, et al.). Briefly, this multi-chamber deposition system employs a large volume vacuum chamber within which are plurality of deposition chambers for different composition layers, each chamber having separate seals to minimize back diffusion of any dopant gases from adjacent deposition chambers. A continuous roll of substrate proceeds from a supply roll through each of the deposition chambers and onto a finished take-up roll. The direction of web travel is reversed repeatedly to produce the multiple layers of repeating refractive index materials.

The index of refraction ($n_A$) of the adhesive 24 should match that of the upper piece 12 as closely as possible. When the index of the adhesive is less than that of the adjoining piece, the non-zero thickness of the adhesive leads to some refraction of light away from the original beam direction. Adhesives having indices on the order of $n_A=1.50$ lead to a loss of a collimated light beam on the order of 1% when used with polycarbonate ($n_O=1.586$) substrates. Adhesives of $n_A=1.56$ are available. Suitable adhesives are Norlund numbers 61 and 81 optical cements ($n_A=1.56$), and an ultraviolet curable resin ($n_A=1.50$) made from Union Carbide number ERL 4221 epoxy resin with 1% (by weight) Minnesota Mining and Manufacturing Company number 41-4201-91185 sulphonium salt initiator. The initiator is dissolved in methelene chloride which must be evaporated off before mixing with the epoxy. Other UV curable mixtures, not as preferred, may be made from urethane acrylate base resins, diacrylate diluents, and suitable photoinitiators. UV curable adhesives may cause slight absorption, mainly in the blue end of the spectrum, in the completed polarizer of about 1–2%.

EXAMPLE

Alternating thin film layers of matched quarterwave optical thickness were coated on the structured side of a 14 mil thick polycarbonate version of the preferred substrate material described in U.S. Pat. No. 4,805,984 (Cobb, Jr.) In Example 1, coating was done by the plasma assisted chemical vapor deposition (PACVD) process described above, using a 5 inch wide and 8 inch long gas "showerhead" type electrode. To form the retroreflective polarizer, an uncoated piece of the TIR material was adhered to the optical stack with an optical adhesive.

Figure 4:
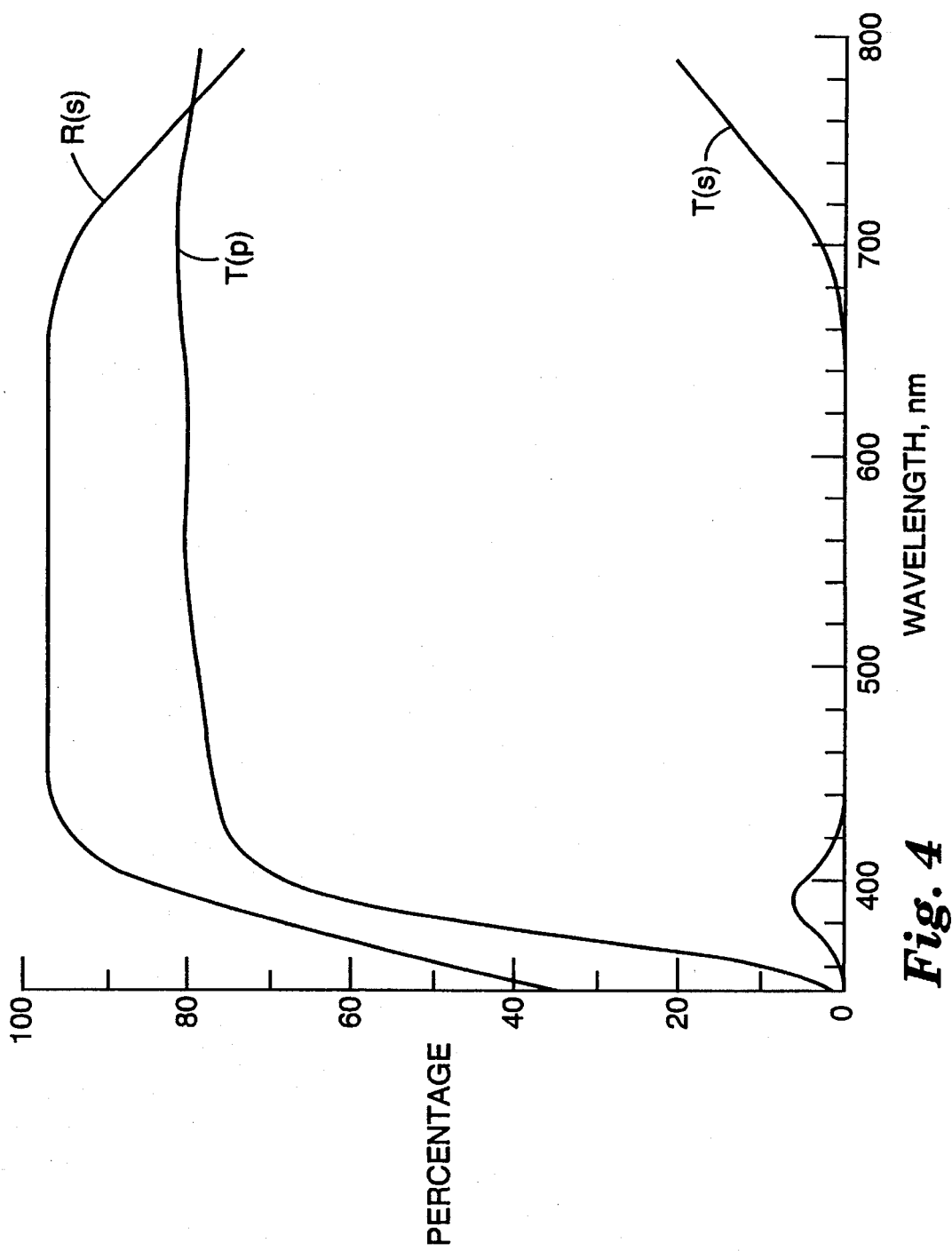
FIG. 4 is a graph of the transmissivity and reflectivity of light incident upon one embodiment of the invention.

In Example 1, the polarizer had three optical stacks, each having twelve layers, either silicon dioxide ($SiO_2$) or titanium dioxide ($TiO_2$). The unusually high number of layers was required because the PACVD technique as described above did not produce a uniform film thickness near the prism peaks as opposed to the bottoms of the grooves. The first stack had a quarterwave thickness centered at 400 nm, the next centered at 550 nm, the third centered at 700 nm. The polarizer performance is shown in FIG. 4. Transmissivity of the s-polarization component, T(s), was at or near zero throughout nearly all the visible spectrum, while reflectivity of that component, R(s), approached the 96% level typical of the most efficient common reflectors. Transmissivity of the p-polarization component, T(p), was very acceptable, nearly 80% or more throughout the visible spectrum.

Applications

The invention is suitable for applications requiring polarized light that would benefit from increasing the intensity of the polarized light available from an unpolarized source, and especially those requiring polarized light over relatively large areas and/or in relatively compact (especially thin) applications.

Figure 3:
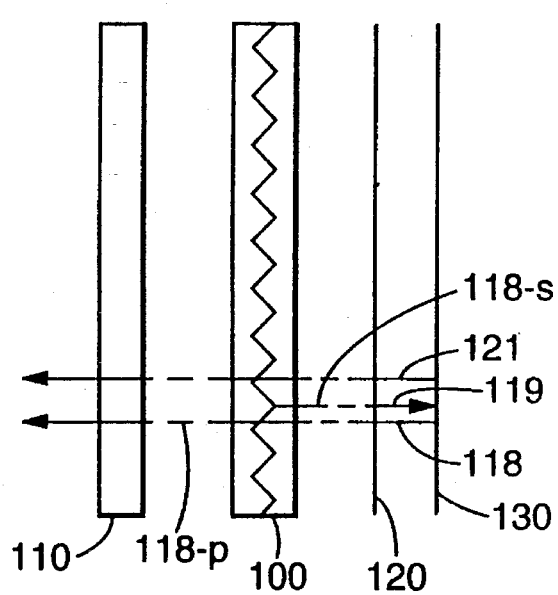
FIG. 3 is a schematic side view of an optical system employing the invention.

For example, the inventive retroreflecting polarizer can be combined in a very simple manner with a quarterwave retardation plate and a reflector to recombine the two components of an incident light beam into a single polarized component of light. Such an arrangement is shown in FIG. 3. A combined reflector and source of incident light 118 is illustrated schematically as 130. Incident light 118, having mixed polarization, is not affected by quarterwave retardation plate 120, but is split into components 118-p and 118-s by retroreflecting polarizer 100. Component 118-p is transmitted directly to display device 110. Component 118-s is retroreflected back through a quarterwave retardation plate 120 as component 119, and reflected (and displaced transversely upward for clarity as component 121) back through the quarterwave retardation plate again. The two passes through the quarterwave retardation plate represent a total rotation of 90°, i.e., component 118-s now has the same polarization direction as component 118-p, and is also directed toward display device 110, thus nearly all of the intensity of incident unpolarized light 118 is available in polarized form at display device 110.

The great advantage of the invention in this system is that because all components may be relatively thin and large in area, and lie on essentially the same optic axis, the profile of the system can be greatly reduced. Where reduction in profile is not as much a concern, or where convenient for other reasons, the optic axis can be redirected without loss of generality.

Reflecting source 130 may be the light source of a backlit computer display, or an overhead projector such as models widely available from the Minnesota Mining and Manufacturing Company. Display device 110 may be a group of one or more birefringent LCD panels, employed in monochrome or color applications, such as those disclosed in U.S. Pat. Nos. 4,917,465 (Conner et al.) and 4,966,441 (Conner).

For this application, assuming a polycarbonate substrate of index $n_O=1.586$, the ideal thin film indices are $n_H=2.0$ and $n_L=1.35$. With this pair of indices, the theoretical minimum composite optical stack for a photoptic (i.e., covering the entire visible spectrum) retroreflecting polarizer is two sets of eight layers, i.e., $(HL)^4+(H'L')^4$. One set has a bandwidth centered on 425 nm and the other has a bandwidth centered on 650 nm. Although cryolite has the most desired low index ($n_L=1.35$), it is soft and slightly hygroscopic, so magnesium fluoride ($n_L=1.38$) is preferred. Zirconium oxide ($n_H=2.05$) is one preferred high index material, although several other materials are suitable.

I claim:

1. A retroreflecting polarizer, comprising:
   (a) a first flexible material about 0.33 mm thick having a structured surface consisting of a linear array of isosceles prisms about 0.18 mm in height arranged side by side and having sides which make an angle in the range of 40° to 50° with respect to the tangent to a smooth surface opposite the structured surface, wherein the isosceles prisms are present at a frequency of about 28 per cm;

(b) a second flexible material essentially like the first flexible material;

(c) on the structured surface of at least one flexible material, at least one optical stack of alternating layers of high and low refractive index materials of selected optical thicknesses;

the first and second flexible materials all optically cemented to form a single unit in which the refractive index of the first and second flexible materials, and the refractive indices and optical thickness of the layers of the optical stack, are all chosen to produce selective reflection of polarized light, and wherein the optical stack is configured to:

(d) separate an incident light beam of mixed polarization having all wavelengths between about 400 and 700 nm into an s-polarized component and a p-polarized component;

(e) reflect the s-polarized component onto another portion of the optical stack and there parallel to the incident beam but proceeding in an opposite direction; and (f) transmit the p-polarized component parallel to the incident beam.

2. A retroreflecting polarizer, comprising:

a first flexible material having a structured surface consisting of a linear array of isosceles prisms arranged side by side and having sides which make an angle in the range of 40° to 50° with respect to the tangent to a smooth surface opposite the structured surface;

a second flexible material essentially like the first flexible material; and an optical stack of alternating layers of high and low refractive index materials of selected optical thicknesses provided between the structured surfaces of the first and second flexible materials, the optical stack comprising at least two sub-stacks: a first sub-stack having a bandwidth centered on a first wavelength within the visible spectrum and a second sub-stack having a bandwidth centered on a second wavelength, different from the first wavelength, within the visible spectrum, wherein the two flexible materials and the optical stack are all optically cemented to form a single unit, and wherein the optical stack is configured to:

separate an incident light beam of mixed polarization having all wavelengths between about 400 and 700 nm into a s-polarized component and a p-polarized component;

reflect the s-polarized component onto another portion of the optical stack and there reflect parallel to the incident beam but proceeding in an opposite direction; and transmit the p-polarized component parallel to the incident beam.

3. The retroreflecting polarizer of claim 2, wherein the first and second sub-stacks are secured to each other by an adhesive provided therebetween.

4. The retroreflecting polarizer of claim 2, wherein the first wavelength is 425 nm.

5. The retroreflecting polarizer of claim 2, wherein the second wavelength is 650 nm.

6. The retroreflecting polarizer of claim 2, wherein the first wavelength is 425 nm and the second wavelength is 650 nm.

7. The retroreflecting polarizer of claim 2, wherein the optical stack further comprises a third sub-stack having a bandwidth centered on a third wavelength within the visible spectrum.

8. The retroreflecting polarizer of claim 7, wherein the first wavelength is 400 nm.

9. The retroreflecting polarizer of claim 7, wherein the second wavelength is 550 nm.

10. The retroreflecting polarizer of claim 7, wherein the third wavelength is 700 nm.

11. The retroreflecting polarizer of claim 7, wherein the first wavelength is 400 nm, the second wavelength is 550 nm, and the third wavelength is 700 nm.

* * * * *